(12) United States Patent
Liu

(10) Patent No.: US 12,468,394 B2
(45) Date of Patent: Nov. 11, 2025

(54) GESTURE INTERACTION METHOD, APPARATUS AND ELECTRONIC DEVICE

(71) Applicant: Beijing Zitiao Network Technology Co., Ltd., Beijing (CN)

(72) Inventor: Chin-Wei Liu, Beijing (CN)

(73) Assignee: BEIJING ZITIAO NETWORK TECHNOLOGY CO. LTD., Beijing (CN)

( * ) Notice: Subject to any disclaimer, the term of this patent is extended or adjusted under 35 U.S.C. 154(b) by 32 days.

(21) Appl. No.: 18/343,183

(22) Filed: Jun. 28, 2023

(65) Prior Publication Data

US 2024/0004478 A1 Jan. 4, 2024

(30) Foreign Application Priority Data

Jun. 29, 2022 (CN) .......................... 202210764835.9

(51) Int. Cl.
G06F 3/0482 (2013.01)
G06F 3/01 (2006.01)

(52) U.S. Cl.
CPC .............. G06F 3/017 (2013.01); G06F 3/011 (2013.01)

(58) Field of Classification Search
CPC ........ G06F 3/01; G06F 3/0484; G06F 3/0481; G06F 3/0482; G06F 3/033; G06F 3/16; G06F 3/0485; G06F 3/0488; G06F 3/00; G06F 3/0354; G06F 3/048; G06F 3/04815; G06F 3/041; G06F 3/03; G06F 3/04817; G06F 3/04883; G06F 3/04845; G06F 3/04847; G06F 3/0338; G06F 3/0487; G06F 3/06; G06F 9/50; G06F 16/11; G06F 16/2457; G06F 16/58; G06F 16/81; G06F 3/04842; G06F 9/455; G06F 1/16; G06F 13/00; G06F 15/00; G06F 17/00; G06F 21/84; G06F 3/023; G06F 3/0346; G06F 3/042; G06F 3/044; G06F 3/04855; G06F 3/04886; G06F 3/14; G06F 9/451

See application file for complete search history.

(56) References Cited

U.S. PATENT DOCUMENTS 9,367,235 B2 * 6/2016 Westerman ............. G06F 3/041
2008/0165255 A1 * 7/2008 Christie .............. G06F 3/04883
340/13.31
2012/0302289 A1 * 11/2012 Kang ...................... G06F 3/016
455/557

(Continued)

FOREIGN PATENT DOCUMENTS

CN 112148120 A 12/2020

Primary Examiner — Rayeez R Chowdhury
(74) Attorney, Agent, or Firm — Astute IP Law Group

(57) ABSTRACT

A method for gesture interaction is proposed. The method includes: obtaining a first reality scene image, and in response to a detection of a first gesture that matches a first predefined gesture in the first reality scene image, displaying, at a first position corresponding to the first gesture, an interface identifier; and obtaining at least one frame of reality scene images, and in response to a detection of a second gesture that matches a second predefined gesture in the at least one frame of reality scene images, displaying the interactive interface at the first position, an operation position of the second gesture corresponding to the first position where the interface identifier is located, the interactive interface comprising at least one functional control.

20 Claims, 7 Drawing Sheets

(56) References Cited

U.S. PATENT DOCUMENTS

| | | | |
|---|---|---|---|
| 2014/0225918 A1* | 8/2014 | Mittal | G06T 19/006 |
| | | | 345/633 |
| 2017/0249384 A1* | 8/2017 | Kandylas | G06F 16/358 |
| 2018/0157333 A1* | 6/2018 | Ross | G06F 3/013 |
| 2018/0158250 A1* | 6/2018 | Yamamoto | G06F 3/011 |
| 2019/0146219 A1* | 5/2019 | Rodriguez | G06F 1/163 |
| | | | 345/633 |
| 2020/0005026 A1* | 1/2020 | Andersen | A63F 13/428 |
| 2020/0089323 A1* | 3/2020 | Chang | G06F 3/013 |
| 2021/0096726 A1* | 4/2021 | Faulkner | G06F 3/013 |

\* cited by examiner

GESTURE INTERACTION METHOD, APPARATUS AND ELECTRONIC DEVICE

CROSS REFERENCE TO RELATED APPLICATIONS

The present application claims priority to Chinese Patent Application No. 202210764835.9, entitled "GESTURE INTERACTION METHOD, APPARATUS AND ELECTRONIC DEVICE," filed on Jun. 29, 2022, the contents of which are hereby incorporated by reference in its entirety.

TECHNICAL FIELD

The present disclosure relates to the field of human-computer interaction technology, and in particular to a gesture interaction method, apparatus, and electronic device.

BACKGROUND

At present, when using Augmented Reality (AR) device (s) or Virtual Reality (VR) device(s), users are allowed to directly trigger the interactive interface by gestures during immersive experience with the device(s). This way of calling out the interactive interface is prone to mistakenly triggering due to gestures.

SUMMARY

In order to solve or at least partially solve the above technical problem, the present disclosure provides a gesture interaction method, apparatus, and electronic device. An interface identifier corresponding to an interactive interface may be triggered to display by a gesture operation, and the interactive interface corresponding to the interface identifier is triggered to display by a second gesture of the interface identifier corresponding to an operation position. Compared to the way of directly triggering to call out the interactive interface by a gesture, calling out the interactive interface through a wrong trigger of gestures may be avoided.

In order to achieve the above objectives, the embodiments of the present disclosure propose the following technical solutions.

In a first aspect, a gesture interaction method is provided. The method comprises:
  obtaining a first reality scene image, and in response to a detection of a first gesture that matches a first predefined gesture in the first reality scene image, displaying, at a first position corresponding to the first gesture, an interface identifier indicating an interactive interface; and
  obtaining at least one frame of reality scene images, and in response to a detection of a second gesture that matches a second predefined gesture in the at least one frame of reality scene images, displaying the interactive interface at the first position, an operation position of the second gesture corresponding to the first position where the interface identifier is located, the interactive interface comprising at least one functional control.

As an optional embodiment of embodiments of the present disclosure, the method further comprises: after the interactive interface is displayed at the first position,
  obtaining a second reality scene image, and in response to a detection of a first touch-control gesture in the second reality scene image, and a touch-control position of the first touch-control gesture corresponding to a position of a target functional control in the interactive interface, performing an operation corresponding to the target functional control, the target functional control being one of the at least one functional control.

As an optional embodiment of the present disclosure, the second gesture is a pull gesture towards a first direction, and the operation position is a pull starting position of the pull gesture; or
  the second gesture is a slide gesture towards a second direction, and the operation position is a slide starting position of the slide gesture; or
  the second gesture is a click gesture, and the operation position is a click position.

As an optional embodiment of embodiments of the present disclosure, the method further comprises: after the interactive interface is displayed at the first position,
  in a case that the first gesture moves, determining motion parameters of the first gesture, determining a target position corresponding to the first gesture based on the first position and the motion parameters, canceling a display of the interactive interface at the first position, and updating the display of the interactive interface at the target position;
  wherein the motion parameters comprise: a motion direction and a motion distance.

As an optional embodiment of embodiments of the present disclosure, the interactive interface further comprises a cancel control, the method further comprises: after the interactive interface is displayed at the first position, obtaining a third reality scene image, and in response to a detection of a second touch-control gesture in the third reality scene image, and a touch-control position of the second touch-control gesture corresponding to a position of the cancel control in the interactive interface, canceling the display of the interactive interface.

As an optional embodiment of the present disclosure, the method further comprises: after the interactive interface is displayed at the first position,
  obtaining a plurality of consecutive frames of reality scene images, and in response to a detection of a third gesture that matches a third predefined gesture in the plurality of consecutive frames of reality scene images, canceling the display of the interactive interface, an operation position of the third gesture corresponding to an interface boundary of the interactive interface in a target direction, the target direction being the first direction or the second direction;
  wherein the second gesture is a pull gesture towards the first direction, and the third gesture is a pull gesture towards an opposite direction of the first direction; or, the second gesture is a slide gesture towards the second direction, and the third gesture is a slide gesture towards an opposite direction of the second direction.

As an optional embodiment of the present disclosure, the method further comprises: after the interactive interface is displayed at the first position,
  obtaining, within a first duration, a plurality of consecutive frames of reality scene images, and in response to a failure of a continuous detection of the first gesture in the plurality of consecutive frames of reality scene images, canceling the display of the interactive interface after the first duration; or
  obtaining reality scene images in real-time, in response to that a deflection angle for detecting the first gesture in two adjacent reality scene images obtained in real-time is greater than a predefined angle, canceling the display of the interactive interface; or obtaining, within a second duration, a plurality of consecutive frames of reality scene images, and in response to a failure of a detection of a touch-control gesture in the plurality of consecutive frames of reality scene images, canceling the display of the interactive interface after the second duration; or obtaining, within a third duration, a plurality of consecutive frames of reality scene images, and in response to a failure of a detection, in the plurality of continuous frames of real scene images, of a correspondence between a touch-control position and a touch-control gesture in the interactive interface, canceling the display of the interactive interface after the third duration.

In a second aspect, a gesture interaction apparatus is provided. The apparatus comprises:

an obtaining module, configured to obtain a first reality scene image;

a displaying module, configured to display, at a first position corresponding to the first gesture, an interface identifier indicating an interactive interface, in response to a detection of a first gesture that matches a first predefined gesture in the first reality scene image;

wherein the obtaining module is further configured to obtain at least one frame of reality scene images; and wherein the displaying module is further configured to display the interactive interface, in response to a detection of a second gesture that matches a second predefined gesture in the at least one frame of reality scene images, an operation position of the second gesture corresponding to the first position where the interface identifier is located, the interactive interface comprising at least one functional control.

As an optional embodiment of embodiments of the present disclosure, the obtaining module is further configured to obtain a second reality scene image after the displaying module displays the interactive interface at the first position; and the apparatus further comprises:

a performing module, configured to perform an operation corresponding to the target functional control, in response to a detection of a first touch-control gesture in the second reality scene image, and a touch-control position of the first touch-control gesture corresponding to a position of a target functional control in the interactive interface, the target functional control being one of the at least one functional control.

As an optional embodiment of the present disclosure, the second gesture is a pull gesture towards a first direction, and the operation position is a pull starting position of the pull gesture, or the second gesture is a slide gesture towards a second direction, and the operation position is a slide starting position of the slide gesture, or the second gesture is a click gesture, and the operation position is a click position.

As an optional embodiment of the present disclosure, the displaying module is further configured to: after the interactive interface is displayed at the first position, in a case that the first gesture moves, determine motion parameters of the first gesture, determine a target position corresponding to the first gesture based on the first position and the motion parameters, cancel a display of the interactive interface at the first position, and update the display of the interactive interface at the target position;

wherein the motion parameters comprise: a motion direction and a motion distance.

As an optional embodiment of the present disclosure, the interactive interface further comprises a cancel control; the obtaining module is further configured to obtain a third reality scene image, after the displaying module displays the interactive interface at the first position;

the displaying module is further configured to cancel the display of the interactive interface, in response to a detection of a second touch-control gesture in the third reality scene image, and a touch-control position of the second touch-control gesture corresponding to a position of the cancel control in the interactive interface.

As an optional embodiment of the present disclosure, the displaying module is further configured to: after the interactive interface is displayed at the first position, obtain a plurality of consecutive frames of reality scene images, and in response to a detection of a third gesture that matches a third predefined gesture in the plurality of consecutive frames of reality scene images, cancel the display of the interactive interface, an operation position of the third gesture corresponding to an interface boundary of the interactive interface in a target direction, the target direction being the first direction or the second direction;

wherein the second gesture is a pull gesture towards the first direction, and the third gesture is a pull gesture towards an opposite direction of the first direction; or, the second gesture is a slide gesture towards the second direction, and the third gesture is a slide gesture towards an opposite direction of the second direction.

As an optional embodiment of the present disclosure, the displaying module is further configured to: after the interactive interface is displayed at the first position, obtain a plurality of consecutive frames of reality scene images within a first duration, and in response to a failure of a continuous detection of the first gesture in the plurality of consecutive frames of reality scene images, cancel the display of the interactive interface after the first duration; or obtain reality scene images in real-time, in response to that a deflection angle for detecting the first gesture in two adjacent reality scene images obtained in real-time is greater than a predefined angle, cancel the display of the interactive interface; or, obtain a plurality of consecutive frames of reality scene images within a second duration, and in response to a failure of a detection of a touch-control gesture in the plurality of consecutive frames of reality scene images, cancel the display of the interactive interface after the second duration; or obtain a plurality of consecutive frames of reality scene images within a third duration, and in response to a failure of a detection, in the plurality of continuous frames of real scene images, of a correspondence between a touch-control position and a touch-control gesture in the interactive interface, cancel the display of the interactive interface after the third duration.

In a third aspect, an electronic device is provided. The electronic device comprises a processor, a memory, and a computer program stored in the memory and executable on the processor, wherein the processor implements the gesture interaction method according to the first aspect when executing the computer program.

In a fourth aspect, a computer-readable storage medium is provided. The computer-readable storage stores a computer program thereon that, when executed by a processor to implement the gesture interaction method according to the first aspect.

In a fifth aspect, a computer program product is provided. The computer program product comprises a computer program, wherein a processor implements the gesture interaction method according to the first aspect when executing the computer program.

The gesture interaction method provided in the embodiments of the present disclosure comprises: obtaining a first reality scene image, and in response to a detection of a first gesture that matches a first predefined gesture in the first reality scene image, displaying, at a first position corresponding to the first gesture, an interface identifier indicating an interactive interface; and obtaining at least one frame of reality scene images, and in response to a detection of a second gesture that matches a second predefined gesture in the at least one frame of reality scene images, displaying the interactive interface at the first position, an operation position of the second gesture corresponding to the first position where the interface identifier is located, the interactive interface comprising at least one functional control. Through this solution, a first position corresponding to a first gesture may be firstly triggered to display an interface identifier by the first gesture. Then the first position is triggered to display the interactive interface including at least one functional control by a second gesture of the first position corresponding to an operation position. Compared to the way of directly triggering to call out the interactive interface by the gesture, calling out the interactive interface through the wrong trigger of gestures may be avoided.

BRIEF DESCRIPTION OF DRAWINGS

The accompanying drawings, which are incorporated in and constitute a part of this specification, illustrate embodiments consistent with the disclosure and use to explain principles of the disclosure together with the specification.

In order to more clearly illustrate technical solutions in embodiments of the present disclosure or the prior art, the following briefly introduces the accompanying drawings that need to be used in the description of the embodiments or the prior art. Apparently, for those of ordinary skill in the art, other drawings can also be obtained from these drawings under the premise of no creative work.

DETAILED DESCRIPTIONS

In order to more clearly understand above objectives, features and advantages of the present disclosure, the solutions of the present disclosure will be further described below. It should be noted that the embodiments of the present disclosure and features in the embodiments may be combined with each other under the condition of no conflict.

Many specific details are set forth in the following description to facilitate a full understanding of the present disclosure, but the present disclosure can also be implemented in other ways different from those described herein; obviously, the embodiments in the specification are only a part, not all, of the embodiments of the present disclosure.

At present, when using Augmented Reality (AR) device(s) or Virtual Reality (VR) device(s), users are allowed to directly trigger the interactive interface by gestures during immersive experience with the device(s). This way of calling out the interactive interface is prone to mistakenly triggering due to gestures.

In order to solve the above problem, embodiments of the present disclosure provide a gesture interaction method, apparatus, and electronic device. First, an interface identifier is triggered, by the first gesture, to be displayed at a first position corresponding to a first gesture. Then, an interactive interface including at least one functional control is triggered by a second gesture at an operation position corresponding to the first position. Compared to the way of directly triggering to call out the interactive interface by the gesture, this way is beneficial to avoid calling out the interactive interface through mistaken trigger of gestures.

The gesture interaction method provided in the embodiments of the present disclosure may be achieved through a gesture interaction apparatus or an electronic device. The gesture interaction apparatus may be a functional module or a functional entity used to perform the gesture interaction method in the electronic device, and the electronic device may include but not be limited to a mobile phone, a computer, an AR device, or a VR device, etc. For example, an AR device may include AR glasses, a VR device may include a VR head display device, etc.

Figure 1:
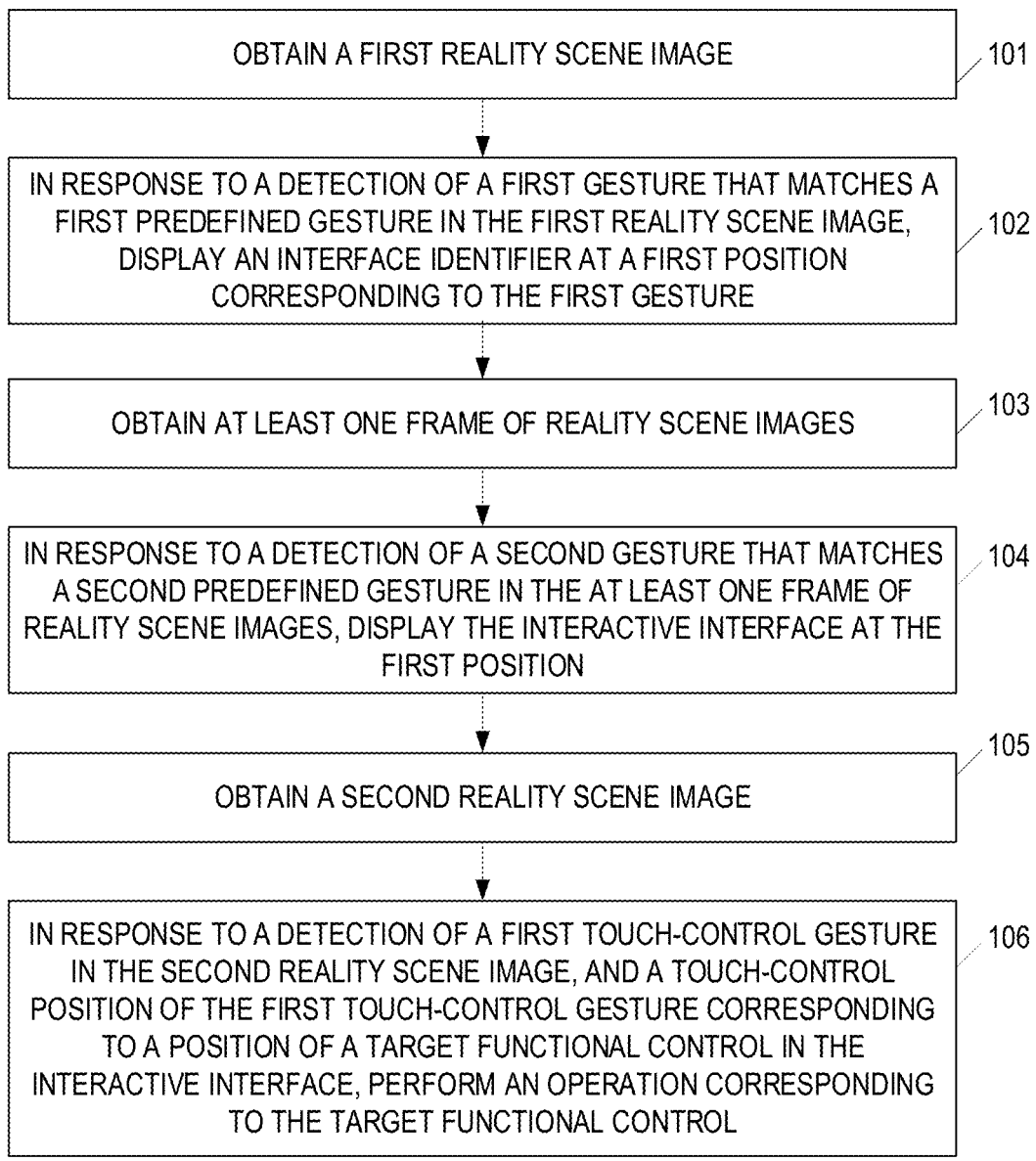
FIG. 1 shows a schematic flowchart of a gesture interaction method provided by embodiments of the present disclosure.

FIG. 1 shows a schematic flowchart of the gesture interaction method provided in the embodiments of the present disclosure. The method includes but is not limited to the following steps 101 to 106.

At 101, a first reality scene image is obtained.

The first reality scene image may be a current reality scene image obtained by a camera.

At 102, in response to a detection of a first gesture that matches a first predefined gesture in the first reality scene image, the interface identifier is displayed at a first position corresponding to the first gesture.

The interface identifier is used to indicate the interactive interface.

The above-mentioned first predefined gesture may be a predefined gesture for triggering a display of the interface identifier.

The first position corresponding to the first gesture may be a certain position within a gesture area of the first gesture in a reality scene image, or the first gesture may be a certain position within a predefined distance range from the gesture area of the first gesture in the reality scene image. The predefined distance range may be set according to an actual need and is not limited in embodiments of the present disclosure.

Figure 2:
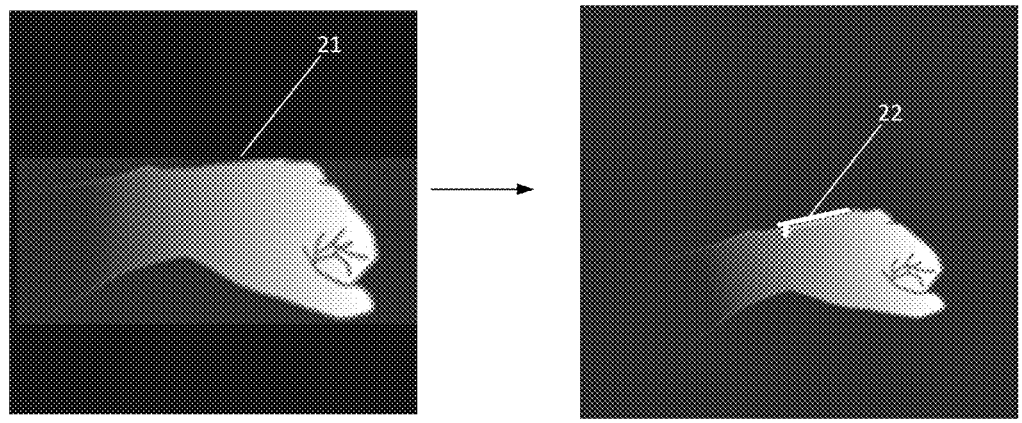
FIG. 2 shows a first schematic diagram of a display of an interface identifier triggered by a first gesture provided by embodiments of the present disclosure.

In an example, FIG. 2 shows a first schematic diagram of a display of the interface identifier triggered by the first gesture. As shown in FIG. 2, if a gesture 21 is detected, an interface identifier 22 may be triggered to be displayed within the gesture area of the gesture 21. It should be noted that the gesture 21 is an example for the first gesture, and in practice, the first gesture may also be in other gesture forms.

Figure 3:
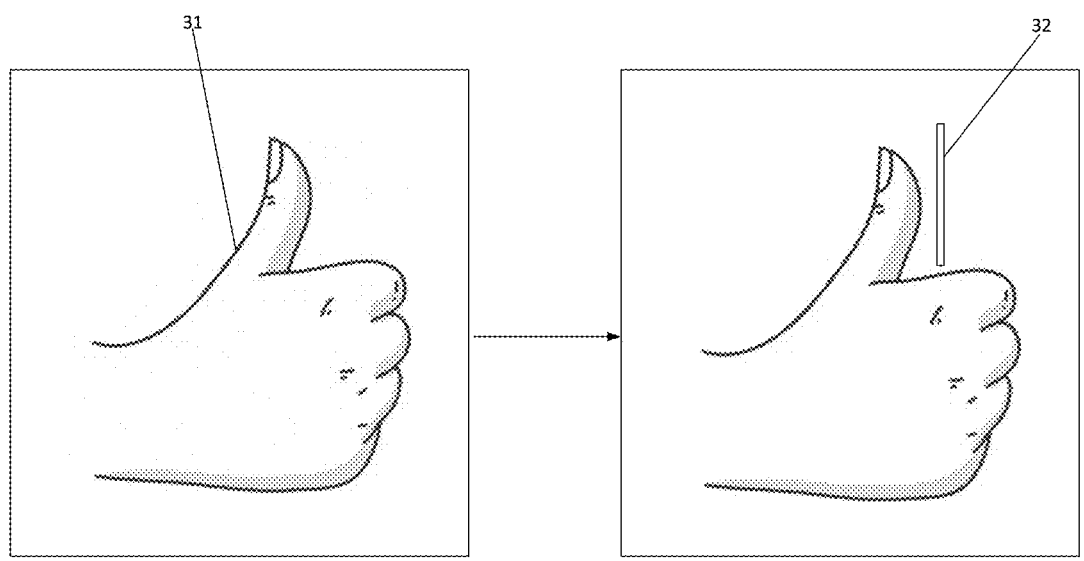
FIG. 3 shows a second schematic diagram of a display of an interface identifier triggered by the first gesture provided by embodiments of the present disclosure.

In an example, FIG. 3 shows a second schematic diagram of a display of an interface identifier triggered by the first gesture. As shown in FIG. 3, when a gesture 31 is detected, an interface identifier 32 may be triggered to be displayed within the predefined distance range from the gesture area above the gesture area of the gesture 31. The gesture 31 is an example for the first gesture, and in practice, the first gesture may also be in other gesture forms.

In practical implementations, the display of the above-mentioned interface identifier may vary depending on different VR and AR scenarios.

In an example of a VR scenario, in a case that a user wears a VR head display device, in some embodiments, the user cannot see a real hand of the user at this time. A reality scene image may be obtained in real-time, and a virtual hand image may be generated by simulating a hand image in the scene image obtained in real-time, and then the generated virtual hand image is displayed in the VR head display device. The above-mentioned interface identifier is overlayed and displayed on an upper layer of the first position corresponding to the first gesture in the virtual hand image.

In an example, in a VR scenario, in the case that the user wears the VR head display device, in some embodiments, the camera of the head display device may be used to capture the reality scene image in real-time, and the reality scene image obtained in real-time is displayed in the VR head display device. The above-mentioned interface identifier is overlayed and displayed on the upper layer of the real-time scene image. The above-mentioned interface identifier may be displayed on the upper layer of the first position corresponding to the first gesture in the virtual hand image in a certain transparency.

In an example, in an AR scenario, when the user wears AR glasses, the user may see the reality scene through the glasses. At this time, the above-mentioned interface identifier may be solely displayed on the screen of the AR glasses, then a picture of the above-mentioned interface identifier overlayed on the reality scene image may be observed by an eye of the user.

At 103, at least one frame of the reality scene images is obtained.

The at least one frame of reality scene images may be one or more frames of reality scene images obtained by the camera after the interface identifier is displayed in response to the first gesture.

At 104, in response to a detection of a second gesture that matches a second predefined gesture in the at least one frame of reality scene images, the interactive interface is displayed at the first position.

The interactive interface includes at least one functional control. This interactive interface may be a shortcut selection interface for the functional control. The operation position of the second gesture corresponds to the first position where the interface identifier is located, and the interactive interface includes at least one functional control.

The above-mentioned second predefined gesture may be a predefined gesture for triggering a display of the interactive interface indicated by the interface identifier.

In the embodiments of the present disclosure, the second gesture may be in various gesture forms, and several possible forms of examples are explained below.

In some embodiments, the second gesture may be a pull gesture towards a first direction. The above-mentioned operation position may refer to a pull starting position of the pull gesture.

In some embodiments, the above-mentioned interactive interface may be displayed depending on the first gesture, which means that the interactive interface is displayed if the first gesture is detected. If the first gesture cannot be continuously detected in the future, the display of the interactive interface is canceled. Alternatively, if a movement of the first gesture is detected later, the display position of the interactive interface changes according to the movement of the first gesture.

In some embodiments, the above-mentioned second gesture and the first gesture may be achieved through different hands. After the first gesture is detected, if the second gesture is detected while the first gesture is continuously detected, then the interactive interface is displayed at the first position.

Figure 4:
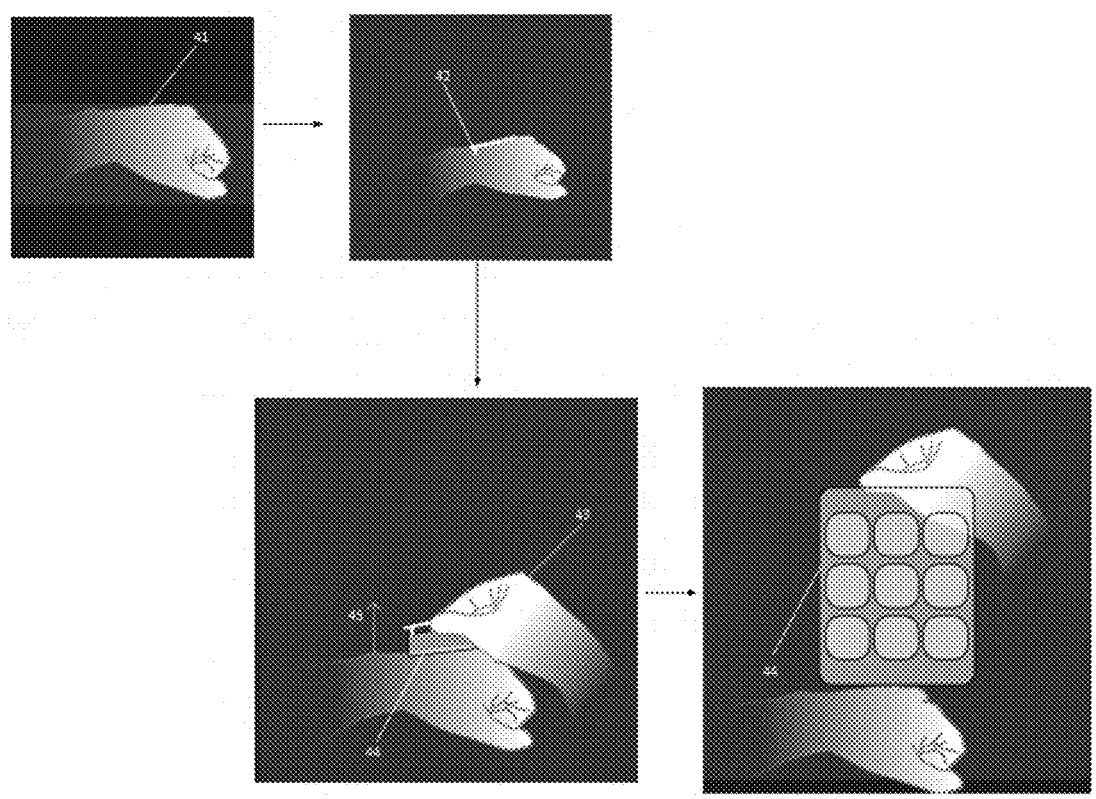
FIG. 4 shows a first schematic diagram of a display of an interactive interface triggered by a second gesture provided by embodiments of the present disclosure.

FIG. 4 shows a first schematic diagram of a display of an interactive interface triggered by the second gesture. In FIG. 4, after the display of an interface identifier 42 is triggered by a gesture 41, an interactive interface 44 is displayed, through a pull gesture 43, at the position where the interface identifier 42 is displayed. The pull gesture 43 moves in the first direction shown by an arrow 45 in FIG. 4.

With a movement of the pull gesture 43, the interactive interface 44 gradually unfolds towards the first direction for display.

In some embodiments, the second gesture may be a slide gesture towards a second direction, and the above-mentioned operation position may refer to a slide starting position of the slide gesture.

Figure 5:
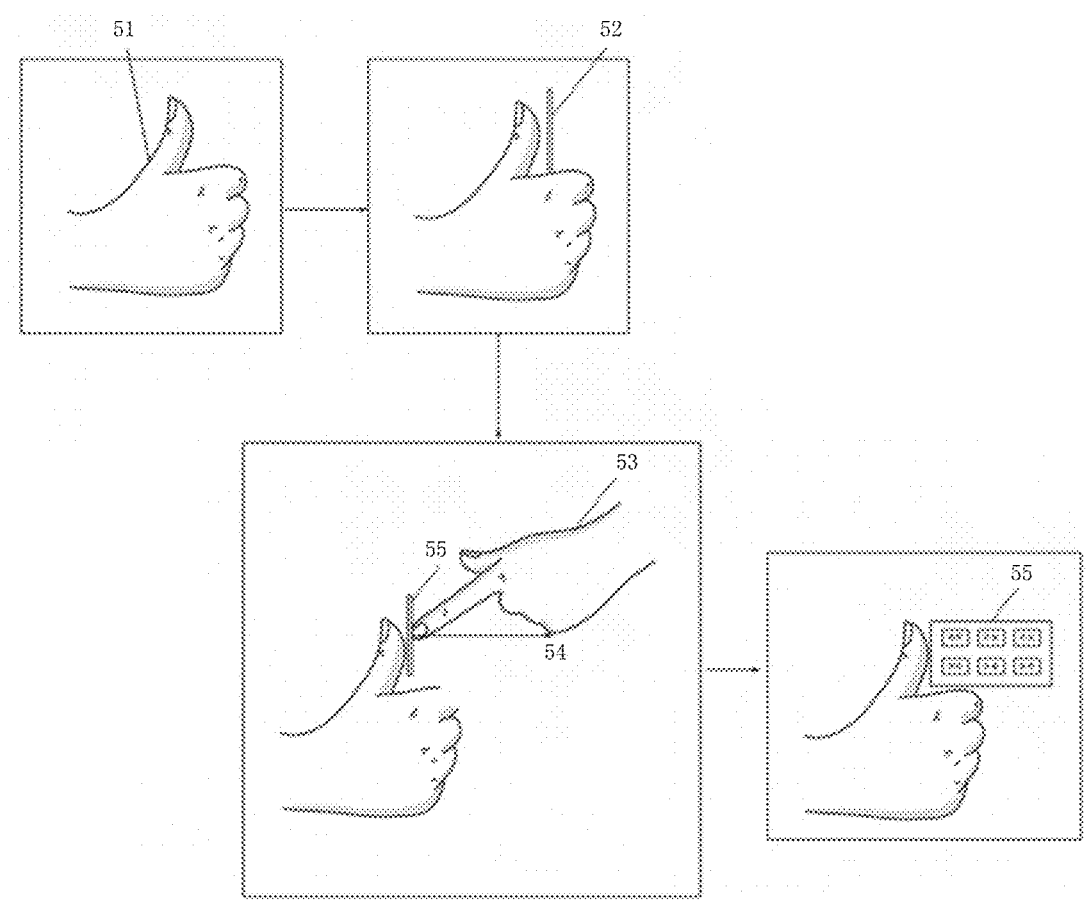
FIG. 5 shows a second schematic diagram of a display of an interactive interface triggered by the second gesture provided by embodiments of the present disclosure.

FIG. 5 shows a second schematic diagram of a display of an interactive interface triggered by the second gesture. In FIG. 5, after the display of an interface identifier 52 is triggered by a gesture 51, an interactive interface 55 is displayed, at a position where the interface identifier 52 is displayed, through a slide gesture 53 sliding in the second direction shown by an arrow 54 in FIG. 5.

In some embodiments, the second gesture may be a click gesture, and the above-mentioned operation position may refer to a click position of the click gesture. After the interface identifier is clicked by the click gesture, the interactive interface may be displayed.

In the case that the above-mentioned second gesture is the pull gesture or the slide gesture, a plurality of frames of reality scene images are needed to detect the second gesture. In the case that the second gesture is the click gesture, the second gesture may be detected by a frame of the reality scene images.

In some embodiments, the interactive interface may move along with the first gesture. After the interactive interface is displayed at the first position, in a case that the first gesture moves, motion parameters of the first gesture may be determined. According to the first position and the motion parameters, a target position corresponding to the first gesture is determined. The display of the interactive interface is canceled at the first position and the display of the interactive interface is updated at the target position. The motion parameters include a motion direction and a motion distance.

Through the above-mentioned embodiments, the user may adjust the display position of the interactive interface through moving the position of the first gesture, which may facilitate the user to adjust the display position of the interactive interface and improve human-machine interaction performance.

Figure 6:
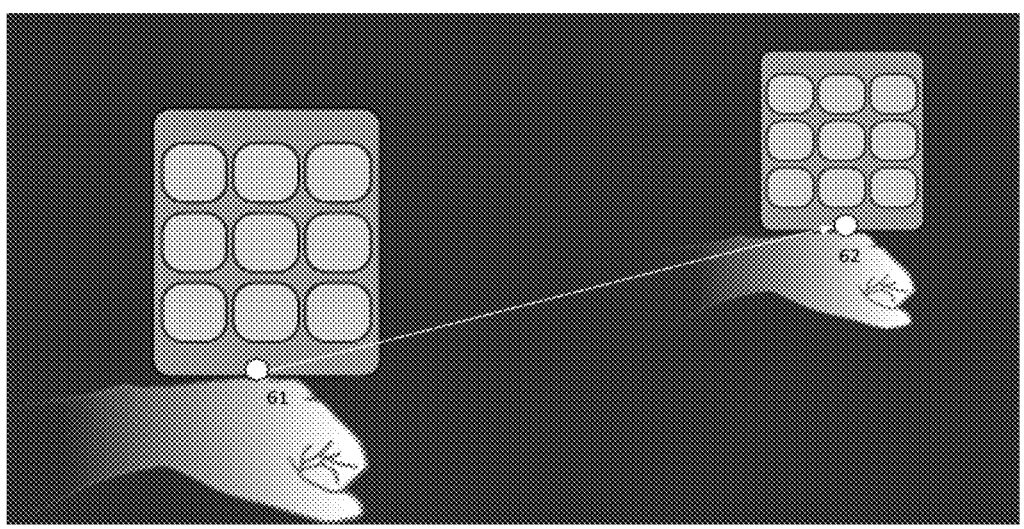
FIG. 6 shows a schematic diagram of an interactive interface moving with the first gesture provided by embodiments of the present disclosure.

In an example, FIG. 6 shows a schematic diagram of an interactive interface moving with the first gesture provided by the embodiments of the present disclosure. In a case that the first gesture is at a position A, the interactive interface is displayed at a first position 61 corresponding to the first gesture. In a case that the first gesture moves from the position A to a position B, the interactive interface moves following the first gesture. The interactive interface is displayed at a target position 62 corresponding to the first gesture.

After the interactive interface is displayed at the first position, whether the first gesture has moved may be detected through the reality scene images that are continuously obtained. In the case that the movement of the first gesture is detected, the motion direction and the motion distance are determined. According to the motion direction and the motion distance, as well as the first position of the interactive interface initially displayed, the target position corresponding to the first gesture after the movement may be determined. The interactive interface is displayed at the target position, and the display of the interactive interface is canceled at the first position.

In implementations, the display of the above-mentioned interactive interface may vary depending on different VR and AR scenarios.

In an example, in a VR scenario, in the case that the user wears the VR head display device, in some embodiments, the user cannot see the real hand of the user at this time. The reality scene image may be obtained in real-time, and the virtual hand image may be generated by simulating the hand image in the scene image obtained in real-time, and then the generated virtual hand image is displayed in the VR head display device. The above-mentioned interactive interface is overlayed and displayed on an upper layer of the virtual hand image.

In an example, in a VR scenario, in the case that the user wears the VR head display device, in some embodiments, the camera of the head display device may be used to obtain the reality scene image in real-time, and the reality scene image obtained in real-time is displayed in the VR head display device. The above-mentioned interactive interface is overlayed and displayed on the upper layer of the real-time scene image. The above-mentioned interactive interface may be displayed on the upper layer of the virtual hand image in a certain transparency.

In an example, in an AR scenario, it is assumed that a user wears AR glasses, and the user may see the reality scene through the glasses. At this time, the above-mentioned interactive interface may be solely displayed on the screen of the AR glasses, and thus a picture of the above-mentioned interactive interface overlayed on the reality scene image may be observed by eyes of the user.

At 105, a second reality scene image is obtained.

The second reality scene image may be the current reality scene image which is obtained by the camera after the interactive interface is displayed in response to the second gesture.

At 106, in response to a detection of a first touch-control gesture in the second reality scene image, as well as a touch-control position of the first touch-control gesture corresponding to a position of a target functional control in the interactive interface, an operation corresponding to the target functional control is performed.

The target functional control is one of the at least one functional control.

The above-mentioned touch-control gesture may be a single-finger touch-control gesture, a multi-finger touch-control gesture (i.e., touch-control gesture with two or more fingers), or a gesture that is touched and controlled by a gesture joint which is not limited by the disclosed embodiments. If the first touch-control position corresponds to the position of the target functional control in the interactive interface, the touch-control gesture may be determined as a touch-control gesture acting on the target functional control. At this time, the operation corresponding to the target functional control is triggered to be performed.

Figure 7:
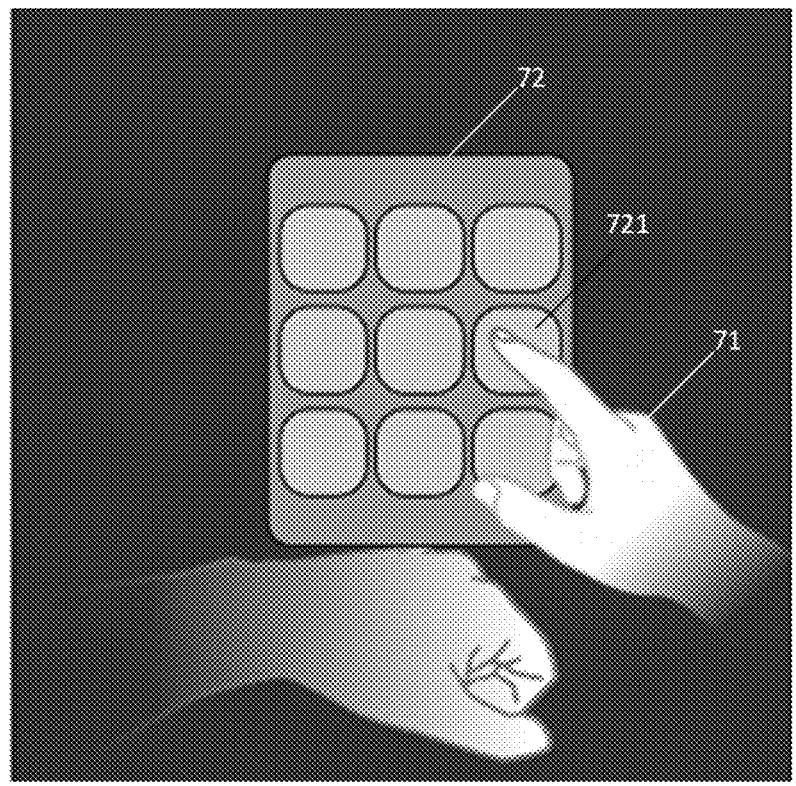
FIG. 7 shows a schematic diagram of triggering a target functional control provided by embodiments of the present disclosure.

In an example, FIG. 7 shows a schematic diagram of triggering the target functional control provided in the embodiments of the present disclosure. When the touch-control position of a touch-control gesture 71 corresponds to a target functional control 721 in an interactive interface 72, the operation corresponding to the target functional control 721 is triggered to be performed.

In some embodiments of the present disclosure, a cancel control may also be set in the interactive interface, so that a third reality scene image may be obtained after the interactive interface is displayed at the first position. In response to the detection of the touch-control gesture in the third reality scene image, and the second touch-control position of the touch-control gesture corresponding to the position of the cancel control in the interactive interface, the display of the interactive interface is canceled.

Figure 8:
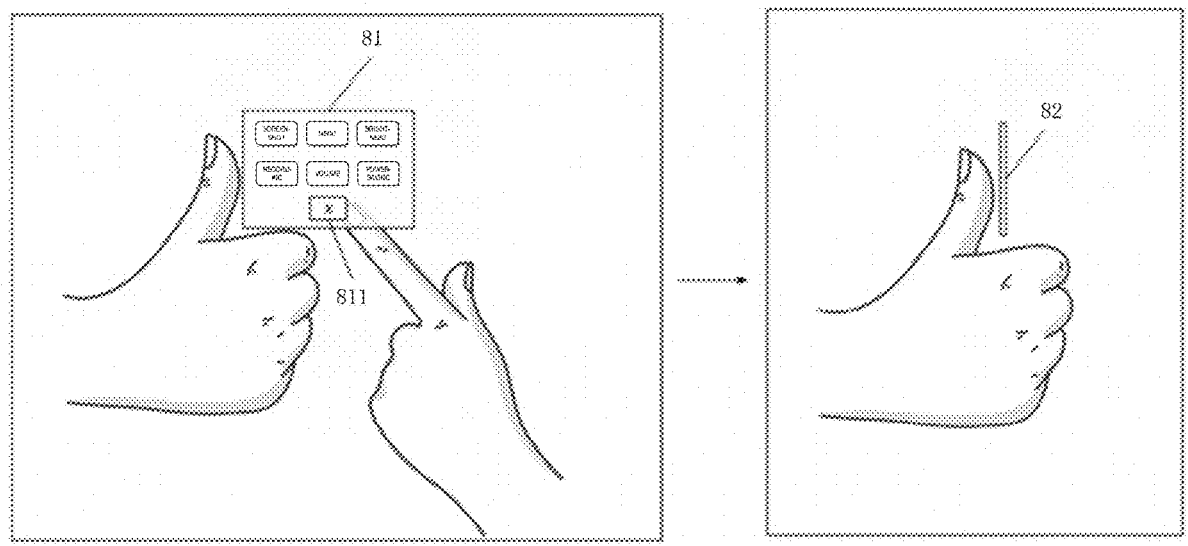
FIG. 8 shows a first schematic diagram of canceling a display of an interactive interface provided by embodiments of the present disclosure.

In an example, as shown in FIG. 8, a first schematic diagram of canceling a display of an interactive interface provided for the embodiments of the present disclosure. A cancel control 811 is set in an interactive interface 81. After a touch-control gesture at a touch-control position corresponding to the position of the cancel control 811 in the interactive interface 81 is detected, the display of the interactive interface 81 is canceled. In some embodiments, after the display of the interactive interface 81 is canceled, an interface identifier 82 for indicating the interactive interface 81 may also be displayed. In some embodiments, after the display of the interactive interface 81 is canceled, the interface identifier 82 may not be displayed.

In some embodiments, if the second gesture is the pull gesture towards the first direction, or if the second gesture is the slide gesture towards the second direction, a plurality of consecutive frames of reality scene images may also be obtained after the interactive interface is displayed in the first position. In response to that a third gesture that matches a third predefined gesture is detected in the plurality of consecutive frames of reality scene images, the display of the interactive interface is canceled. The operation position of the third gesture corresponds to an interface boundary of the interactive interface in a target direction, and the target direction is the first direction or the second direction.

If the second gesture is the pull gesture towards the first direction, the third gesture may be the pull gesture towards an opposite direction of the first direction. Alternatively, if the second gesture is the slide gesture towards the second direction, the third gesture is the slide gesture towards the opposite direction of the second direction.

The above-mentioned third predefined gesture is a gesture set for triggering to cancel the display of the interactive interface.

Figure 9A:
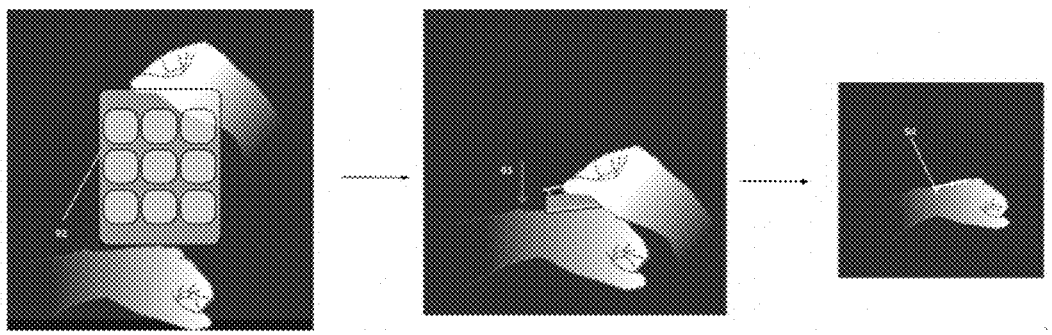
FIG. 9A shows a second schematic diagram of canceling a display of an interactive interface provided by embodiments of the present disclosure.

FIG. 9A shows a second schematic diagram of canceling a display of an interactive interface provided by embodiments of the present disclosure. After an interactive interface 92 is displayed, the display of the interactive interface 92 may be triggered to be cancelled through a pull gesture towards the opposite direction of the pull gesture shown in FIG. 4 (the direction of an arrow 93 shown in FIG. 9). In some embodiments, after the display of the interactive interface 92 is canceled, an interface identifier 94 for indicating the interactive interface 92 may also be displayed. In other embodiments, after the display of the interactive interface 92 is canceled, the interface identifier 94 may not be displayed.

In some embodiments, in the case that the interactive interface follows the first gesture to display, a continuous display of the interactive interface requires continuous detection of the first gesture. After the interactive interface is displayed at the first position, within a first duration, the plurality of consecutive frames of reality scene images may be obtained. If the first gesture has not been continuously detected in the plurality of consecutive frames of reality scene images, indicating that the user has canceled the first gesture, the display of the interactive interface may be triggered to be canceled.

In some embodiments, whether the shake amplitude of the first gesture exceeds a certain amplitude may be detected based on the deflection angle of the first gesture. After the interactive interface is displayed at the first position, the reality scene images are obtained in real-time. If the deflection angle for detecting the first gesture in two adjacent reality scene images obtained in real-time is greater than the predefined angle, which indicates that the shaking amplitude of the first gesture exceeds the certain amplitude, the display of the interactive interface may be canceled.

The above-mentioned deflection angle may be the deflection angle at any degree of freedom.

Figure 9B:
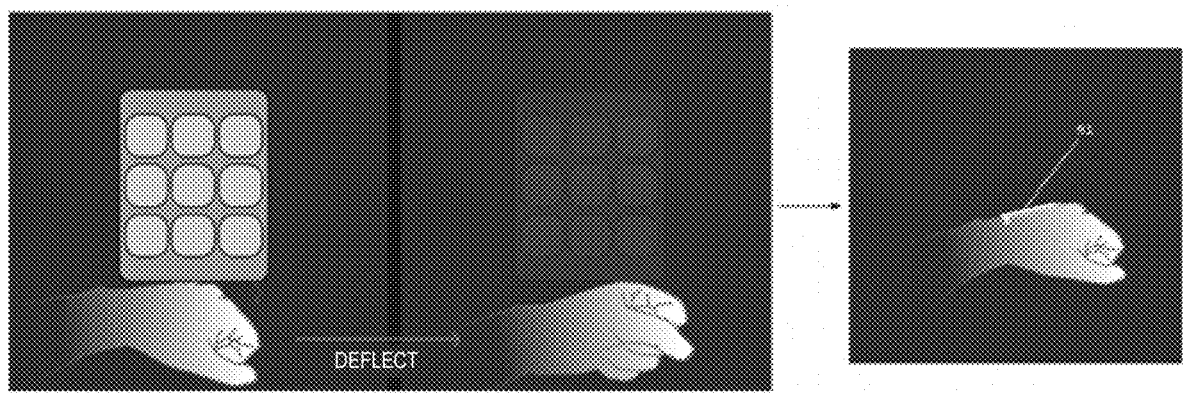
FIG. 9B shows a third schematic diagram of canceling a display of an interactive interface provided by embodiments of the present disclosure.

FIG. 9B shows a third schematic diagram of canceling a display of an interactive interface provided by embodiments of the present disclosure. In the case that the deflection angle of the first gesture is detected to be greater than the predefined angle, the display of the interactive interface is canceled and the interface identifier 91 is displayed. In further embodiments, after the display of the interactive interface is canceled, the interface identifier 91 may not be displayed.

In some embodiments, if no touch-control gesture is detected for a long time, the display of the interactive interface may also be canceled. After the interactive interface is displayed at the first position, the plurality of consecutive frames of reality scene images are obtained within the second duration. If no touch-control gesture is detected in the plurality of consecutive frames of reality scene images, the display of the interactive interface is canceled after the second duration.

In some embodiments, if no touch-control gesture corresponding to a functional control in the interactive interface is detected for a long time, the display of the interactive interface may also be canceled. A plurality of consecutive frames of reality scene images are obtained within a third duration. If no touch-control gesture at the touch-control position corresponding to the interactive interface is detected in the plurality of consecutive frames of reality scene images, the display of the interactive interface is canceled after the third duration.

The first duration, the second duration, and the third duration mentioned above may be set according to an actual situation. Specifically, values of these durations are not limited by the embodiments of the present disclosure.

Various methods for canceling the display of the interactive interface are provided in the embodiments of the present disclosure. The cancelation of the interactive interface may be flexibly implemented according to these methods, thereby improving the flexibility of the gesture interaction method in the embodiments of the present disclosure.

Figure 10:
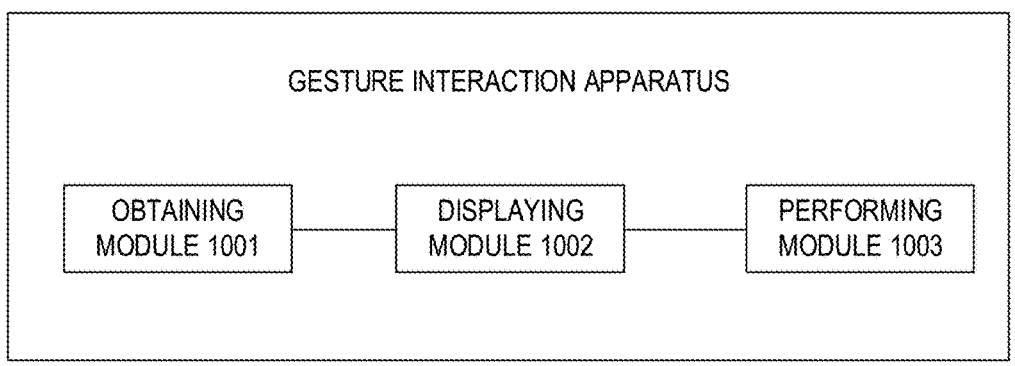
FIG. 10 shows a structural block diagram of a gesture interaction apparatus provided by embodiments of the present disclosure.

As shown in FIG. 10, a structural block diagram of a gesture interaction apparatus is provided for the embodiments of the present disclosure. The apparatus comprises:
  an obtaining module 1001 configured to obtain the first reality scene image;
  a displaying module 1002 configured to display the interface identifier at the first position corresponding to the first gesture, in response to the detection of the first gesture that matches the first predefined gesture in the first reality scene image;
  the obtaining module 1001 is further configured to obtain at least one frame of reality scene images;
  the display module 1002 is further configured to display the interactive interface, in response to the detection of the second gesture that matches the second predefined gesture in the at least one frame of reality scene images, an operation position of the second gesture corresponding to the first position where the interface identifier is located, the interactive interface comprising at least one functional control.

As an optional embodiment of the present disclosure, the obtaining module 1001 is further configured to obtain the second reality scene image after the displaying module 1002 displays the interactive interface at the first position.

The apparatus further comprises:
  a performing module 1003, configured to perform an operation corresponding to the target functional control, in response to the detection of the first touch-control gesture in the second reality scene image, and the touch-control position of the first touch-control gesture corresponding to the position of the target functional control in the interactive interface, the target functional control being one of the at least one functional control.

As an optional embodiment of the present disclosure:
  the second gesture is the pull gesture towards the first direction, and the operation position is the pull starting position of the pull gesture;
  the second gesture is the slide gesture towards the second direction, and the operation position is the slide starting position of the slide gesture;
  the second gesture is the click gesture, and the operation position is the click position.

As an optional embodiment of the present disclosure, the displaying module 1002 is further configured to: after the interactive interface is displayed at the first position, in the case that the first gesture moves, determine motion parameters of the first gesture, determine the target position corresponding to the first gesture based on the first position and the motion parameters, cancel the display of the interactive interface at the first position, and update the display of the interactive interface at the target position;
  wherein the motion parameters comprise: the motion direction and the motion distance.

As an optional embodiment of the present disclosure, the interactive interface further comprises the cancel control; the obtaining module is further configured to obtain the third reality scene image, after the displaying module displays the interactive interface at the first position;

the displaying module 1002 is further configured cancel the display of the interactive interface, in response to the detection of the second touch-control gesture in the third reality scene image, and the touch-control position of the second touch-control gesture corresponding to the position of the cancel control in the interactive interface.

As an optional embodiment of the present disclosure, the displaying module 1002 is further configured to: after the interactive interface is displayed at the first position, obtain the plurality of consecutive frames of reality scene images, and in response to the detection of the third gesture that matches the third predefined gesture in the plurality of consecutive frames of reality scene images, cancel the display of the interactive interface, an operation position of the third gesture corresponding to an interface boundary of the interactive interface in the target direction, the target direction being the first direction or the second direction;

wherein the second gesture is the pull gesture towards the first direction, and the third gesture is the pull gesture towards an opposite direction of the first direction; or, the second gesture is the slide gesture towards the second direction, and the third gesture is the slide gesture towards an opposite direction of the second direction.

As an optional embodiment of the present disclosure, the displaying module 1002 is further configured to: after the interactive interface is displayed at the first position, obtain the plurality of consecutive frames of reality scene images within the first duration, and in response to the failure of the continuous detection of the first gesture in the plurality of consecutive frames of reality scene images, cancel the display of the interactive interface after the first duration; or obtain reality scene images in real-time, in response to that the deflection angle for detecting the first gesture in two adjacent reality scene images obtained in real-time is greater than the predefined angle, cancel the display of the interactive interface; or, obtain the plurality of consecutive frames of reality scene images within the second duration, and in response to the failure of the detection of the touch-control gesture in the plurality of consecutive frames of reality scene images, cancel the display of the interactive interface after the second duration; or obtain the plurality of consecutive frames of reality scene images within the third duration, and in response to the failure of the detection, in the plurality of continuous frames of real scene images, of the correspondence between the touch-control position and the touch-control gesture in the interactive interface, cancel the display of the interactive interface after the third duration.

Figure 11:
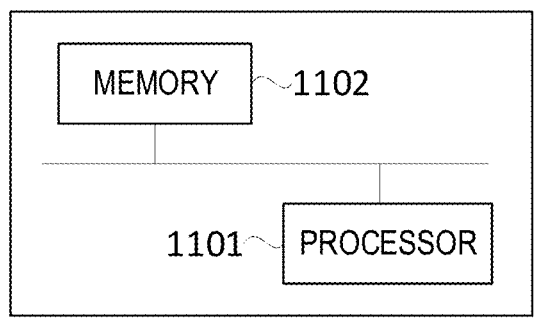
FIG. 11 shows a schematic diagram of a structure of an electronic device provided by embodiments of the present disclosure.

As shown in FIG. 11, the embodiments of the present disclosure provides an electronic device, which includes a processor 1101, a memory 1102, and a computer program which is stored on the memory 1102 and capable of running on the processor 1101. The computer program is executed by the processor 1101 to implement the various processes of the gesture interaction method in the above-mentioned embodiments, and the same technical effect may be achieved. To avoid repetition, it will not be repeated here.

The embodiments of the present disclosure provides a computer readable storage medium. A computer program is stored on the computer readable storage medium. The computer program is executed by the processor to implement the various processes of the gesture interaction method in the above-mentioned embodiments, and the same technical effect may be achieved. To avoid repetition, it will not be repeated here.

The computer readable storage medium may be a read-only memory (ROM), a random access memory (RAM), a magnetic disc or an optical disc, etc.

The embodiments of the present disclosure provides a computer program product that stores a computer program. The computer program is executed by the processor to implement the various processes of the gesture interaction method in the above-mentioned embodiments, and the same technical effect may be achieved. To avoid repetition, it will not be repeated here.

Those skilled in the art should understand that the disclosed embodiments may be provided as a method, a system, or a computer program product. Therefore, the present disclosure may take the form of a complete hardware embodiment, a complete software embodiment, or an embodiment combining software and hardware aspects. Moreover, the present disclosure may take the form of a computer program product implemented on one or more computer-usable storage mediums containing computer-usable program code.

In the present disclosure, the processor may be a central processing unit (CPU), other general-purpose processors, a digital signal processor (DSP), an application specific integrated circuit (ASIC), a field programmable gate array (FPGA), or other programmable logic devices, a discrete gate, or a transistor logic device, a discrete hardware component, etc. A general-purpose processor may be a microprocessor or any conventional processor, etc.

In the present disclosure, the memory may include a non-permanent memory, a random access memory (RAM), and/or a non-volatile memory in a computer-readable media, such as a read-only memory (ROM) or a flash memory (flash RAM). The memory is an example of a computer-readable medium.

In the present disclosure, the computer readable medium includes permanent and non-permanent, movable and non-movable storage medium. The storage medium can be implemented by any method or technology to store information, which can be computer-readable instructions, a data structure, a program module, or other data. Examples of the storage medium for computers include, but are not limited to, a phase change memory (PRAM), a static random access memory (SRAM), a dynamic random access memory (DRAM), other types of random access memory (RAM), a read-only memory (ROM), an electrically erasable programmable read-only memory (EEPROM), a flash memory or other memory technologies, a compact disc read-only memory (CD-ROM), a digital versatile disc (DVD), or other optical storage, a magnetic tape cartridge, a magnetic disk storage or other magnetic storage devices, or any other non-transmission medium, can be used to store information that can be accessed by a computing device. As defined herein, a computer-readable medium excludes a transitory computer-readable medium, such as modulated data signals and carrier waves.

It should be noted that in this article, relational terms such as "first" and "second" are only used to distinguish one entity or operation from another entity or operation, and do not necessarily require or imply any actual relationship or order between these entities or operations. Moreover, the terms "comprising", "including", or any other variation thereof are intended to encompass non-exclusive inclusion, such that a process, a method, an item, or a device that includes a series of elements not only includes those elements, but also other elements that are not explicitly listed, or also include elements inherent in such a process, a method, an item, or a device. Without further limitations, the element limited by the statement "including one . . . " do not exclude the existence of other identical elements in the process, the method, the item, or the device that includes the said elements.

The above is only the specific implementation method of the present disclosure, which enables those skilled in the art to understand or implement this disclosure. Various modifications to these embodiments will be apparent to those skilled in the art, and the general principles defined in this article may be implemented in other embodiments without departing from the spirit or scope of the present disclosure. Therefore, this disclosure will not be limited to the embodiments described herein, but rather to the widest scope consistent with the principles and novel features disclosed herein.

I claim:

1. A gesture interaction method, comprising:
   obtaining a first reality scene image, and in response to a detection of a first gesture that matches a first predefined gesture in the first reality scene image, displaying, at a first position corresponding to the first gesture, an interface identifier indicating an interactive interface;
   obtaining at least one frame of reality scene images, and in response to a detection of a second gesture that matches a second predefined gesture in the at least one frame of reality scene images, displaying the interactive interface at the first position, an operation position of the second gesture corresponding to the first position where the interface identifier is located, wherein the second gesture is a motion gesture, and displaying the interactive interface comprises:
      unfolding the interactive interface towards a motion direction of the motion gesture at a position where the interface identifier is displayed in response to the second gesture, and the unfolded interactive interface comprises at least one functional control; and
   obtaining a plurality of consecutive frames of reality scene images after the interactive interface is displayed at the first position, and in response to a failure of a detection of a predetermined gesture in the plurality of consecutive frames of reality scene images, canceling the display of the interactive interface.

2. The method according to claim 1, further comprising: after the interactive interface is displayed at the first position,
   obtaining a second reality scene image, and
   in response to a detection of a first touch-control gesture in the second reality scene image, and a touch-control position of the first touch-control gesture corresponding to a position of a target functional control in the interactive interface, performing an operation corresponding to the target functional control, the target functional control being one of the at least one functional control.

3. The method according to claim 1, wherein
   the motion gesture is a pull gesture towards a first direction, and the operation position is a pull starting position of the pull gesture, or
   the motion gesture is a slide gesture towards a second direction, and the operation position is a slide starting position of the slide gesture.

4. The method according to claim 1, further comprising: after the interactive interface is displayed at the first position,
   in a case that the first gesture moves, determining motion parameters of the first gesture, determining a target position corresponding to the first gesture based on the first position and the motion parameters, canceling a display of the interactive interface at the first position, and updating the display of the interactive interface at the target position;
   wherein the motion parameters comprise: a motion direction and a motion distance.

5. The method according to claim 1, wherein the interactive interface further comprises a cancel control, and the method further comprises: after the interactive interface is displayed at the first position,
   obtaining a third reality scene image, and in response to a detection of a second touch-control gesture in the third reality scene image, and a touch-control position of the second touch-control gesture corresponding to a position of the cancel control in the interactive interface, canceling the display of the interactive interface.

6. The method according to claim 3, further comprising: after the interactive interface is displayed at the first position,
   obtaining a plurality of consecutive frames of reality scene images, and
   in response to a detection of a third gesture that matches a third predefined gesture in the plurality of consecutive frames of reality scene images, canceling the display of the interactive interface, an operation position of the third gesture corresponding to an interface boundary of the interactive interface in a target direction, the target direction being the first direction or the second direction;
   wherein the second gesture is a pull gesture towards the first direction, and the third gesture is a pull gesture towards an opposite direction of the first direction; or, the second gesture is a slide gesture towards the second direction, and the third gesture is a slide gesture towards an opposite direction of the second direction.

7. The method according to claim 1,
   wherein canceling the display of the interactive interface comprises any of:
   obtaining, within a first duration, a plurality of consecutive frames of reality scene images, and in response to a failure of a continuous detection of the first gesture in the plurality of consecutive frames of reality scene images, canceling the display of the interactive interface after the first duration; or
   obtaining, within a second duration, a plurality of consecutive frames of reality scene images, and in response to a failure of a detection of a touch-control gesture in the plurality of consecutive frames of reality scene images, canceling the display of the interactive interface after the second duration; or
   obtaining, within a third duration, a plurality of consecutive frames of reality scene images, and in response to a failure of a detection, in the plurality of continuous frames of real scene images, of a correspondence between a touch-control position and a touch-control gesture in the interactive interface, canceling the display of the interactive interface after the third duration; or
   wherein the method further comprises: obtaining reality scene images in real-time, in response to that a deflection angle for detecting the first gesture in two adjacent reality scene images obtained in real-time is greater than a predefined angle, canceling the display of the interactive interface.

8. An electronic device, comprising a processor, a memory, and a computer program stored in the memory and executable on the processor, wherein the computer program, when executed by the processor, causes the processor to perform a gesture interaction method comprising:
obtaining a first reality scene image, and in response to a detection of a first gesture that matches a first predefined gesture in the first reality scene image, displaying, at a first position corresponding to the first gesture, an interface identifier indicating an interactive interface;
obtaining at least one frame of reality scene images, and in response to a detection of a second gesture that matches a second predefined gesture in the at least one frame of reality scene images, displaying the interactive interface at the first position, an operation position of the second gesture corresponding to the first position where the interface identifier is located, wherein the second gesture is a motion gesture, and displaying the interactive interface comprises:
unfolding the interactive interface towards a motion direction of the motion gesture at a position where the interface identifier is displayed in response to the second gesture, and the unfolded interactive interface comprises at least one functional control; and
obtaining a plurality of consecutive frames of reality scene images after the interactive interface is displayed at the first position, and in response to a failure of a detection of a predetermined gesture in the plurality of consecutive frames of reality scene images, canceling the display of the interactive interface.

9. The electronic device according to claim 8, wherein the method further comprises: after the interactive interface is displayed at the first position,
obtaining a second reality scene image, and
in response to a detection of a first touch-control gesture in the second reality scene image, and a touch-control position of the first touch-control gesture corresponding to a position of a target functional control in the interactive interface, performing an operation corresponding to the target functional control, the target functional control being one of the at least one functional control.

10. The electronic device according to claim 8, wherein
the motion gesture is a pull gesture towards a first direction, and the operation position is a pull starting position of the pull gesture, or
the motion gesture is a slide gesture towards a second direction, and the operation position is a slide starting position of the slide gesture.

11. The electronic device according to claim 8, wherein the method further comprises: after the interactive interface is displayed at the first position,
in a case that the first gesture moves, determining motion parameters of the first gesture, determining a target position corresponding to the first gesture based on the first position and the motion parameters, canceling a display of the interactive interface at the first position, and updating the display of the interactive interface at the target position;
wherein the motion parameters comprise: a motion direction and a motion distance.

12. The electronic device according to claim 8, wherein the interactive interface further comprises a cancel control, and the method further comprises: after the interactive interface is displayed at the first position,
obtaining a third reality scene image, and in response to a detection of a second touch-control gesture in the third reality scene image, and a touch-control position of the second touch-control gesture corresponding to a position of the cancel control in the interactive interface, canceling the display of the interactive interface.

13. The electronic device according to claim 10, wherein the method further comprises: after the interactive interface is displayed at the first position,
obtaining a plurality of consecutive frames of reality scene images, and
in response to a detection of a third gesture that matches a third predefined gesture in the plurality of consecutive frames of reality scene images, canceling the display of the interactive interface, an operation position of the third gesture corresponding to an interface boundary of the interactive interface in a target direction, the target direction being the first direction or the second direction;
wherein the second gesture is a pull gesture towards the first direction, and the third gesture is a pull gesture towards an opposite direction of the first direction; or, the second gesture is a slide gesture towards the second direction, and the third gesture is a slide gesture towards an opposite direction of the second direction.

14. The electronic device according to claim 8,
wherein canceling the display of the interactive interface comprises any of:
obtaining, within a first duration, a plurality of consecutive frames of reality scene images, and in response to a failure of a continuous detection of the first gesture in the plurality of consecutive frames of reality scene images, canceling the display of the interactive interface after the first duration; or
obtaining, within a second duration, a plurality of consecutive frames of reality scene images, and in response to a failure of a detection of a touch-control gesture in the plurality of consecutive frames of reality scene images, canceling the display of the interactive interface after the second duration; or
obtaining, within a third duration, a plurality of consecutive frames of reality scene images, and in response to a failure of a detection, in the plurality of continuous frames of real scene images, of a correspondence between a touch-control position and a touch-control gesture in the interactive interface, canceling the display of the interactive interface after the third duration; or
wherein the method further comprises: obtaining reality scene images in real-time, in response to that a deflection angle for detecting the first gesture in two adjacent reality scene images obtained in real-time is greater than a predefined angle, canceling the display of the interactive interface.

15. A non-transitory computer-readable storage medium, storing a computer program thereon that, when executed by a processor, causes the processor to perform a gesture interaction method comprising:
obtaining a first reality scene image, and in response to a detection of a first gesture that matches a first predefined gesture in the first reality scene image, displaying, at a first position corresponding to the first gesture, an interface identifier indicating an interactive interface;

obtaining at least one frame of reality scene images, and in response to a detection of a second gesture that matches a second predefined gesture in the at least one frame of reality scene images, displaying the interactive interface at the first position, an operation position of the second gesture corresponding to the first position where the interface identifier is located, wherein the second gesture is a motion gesture, and displaying the interactive interface comprises:

unfolding the interactive interface towards a motion direction of the motion gesture at a position where the interface identifier is displayed in response to the second gesture, and the unfolded interactive interface comprises at least one functional control; and obtaining a plurality of consecutive frames of reality scene images after the interactive interface is displayed at the first position, and in response to a failure of a detection of a predetermined gesture in the plurality of consecutive frames of reality scene images, canceling the display of the interactive interface.

16. The computer-readable storage medium according to claim 15, wherein the method further comprises: after the interactive interface is displayed at the first position, obtaining a second reality scene image, and in response to a detection of a first touch-control gesture in the second reality scene image, and a touch-control position of the first touch-control gesture corresponding to a position of a target functional control in the interactive interface, performing an operation corresponding to the target functional control, the target functional control being one of the at least one functional control.

17. The computer-readable storage medium according to claim 15, wherein the motion gesture is a pull gesture towards a first direction, and the operation position is a pull starting position of the pull gesture, or the motion gesture is a slide gesture towards a second direction, and the operation position is a slide starting position of the slide gesture.

18. The computer-readable storage medium according to claim 15, wherein the method further comprises: after the interactive interface is displayed at the first position, in a case that the first gesture moves, determining motion parameters of the first gesture, determining a target position corresponding to the first gesture based on the first position and the motion parameters, canceling a display of the interactive interface at the first position, and updating the display of the interactive interface at the target position;

wherein the motion parameters comprise: a motion direction and a motion distance.

19. The computer-readable storage medium according to claim 15, wherein the interactive interface further comprises a cancel control, and the method further comprises: after the interactive interface is displayed at the first position, obtaining a third reality scene image, and in response to a detection of a second touch-control gesture in the third reality scene image, and a touch-control position of the second touch-control gesture corresponding to a position of the cancel control in the interactive interface, canceling the display of the interactive interface.

20. The computer-readable storage medium according to claim 17, wherein the method further comprises: after the interactive interface is displayed at the first position, obtaining a plurality of consecutive frames of reality scene images, and in response to a detection of a third gesture that matches a third predefined gesture in the plurality of consecutive frames of reality scene images, canceling the display of the interactive interface, an operation position of the third gesture corresponding to an interface boundary of the interactive interface in a target direction, the target direction being the first direction or the second direction;

wherein the second gesture is a pull gesture towards the first direction, and the third gesture is a pull gesture towards an opposite direction of the first direction; or, the second gesture is a slide gesture towards the second direction, and the third gesture is a slide gesture towards an opposite direction of the second direction.

* * * * *